H. D. RICKARD.
EDUCATIONAL APPLIANCE.
APPLICATION FILED OCT. 8, 1915.
1,169,510.
Patented Jan. 25, 1916.
2 SHEETS—SHEET 1.
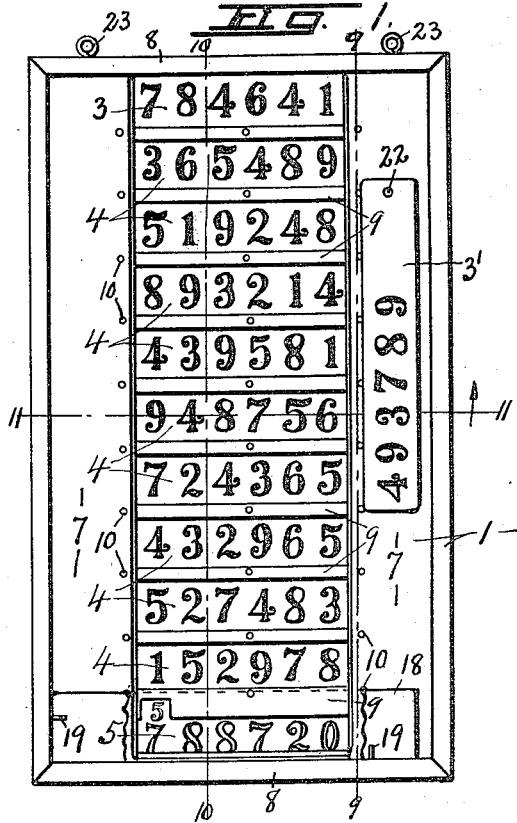
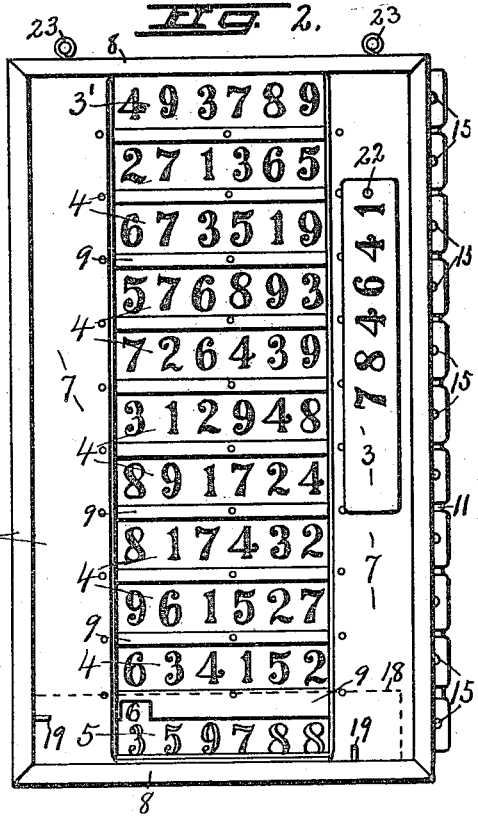
WITNESSES:
INVENTOR
H. D. Rickard
BY Howard P. Denton
ATTORNEY.

H. D. RICKARD.
EDUCATIONAL APPLIANCE.
APPLICATION FILED OCT. 8, 1915.
1,169,510.
Patented Jan. 25, 1916.
2 SHEETS—SHEET 2.
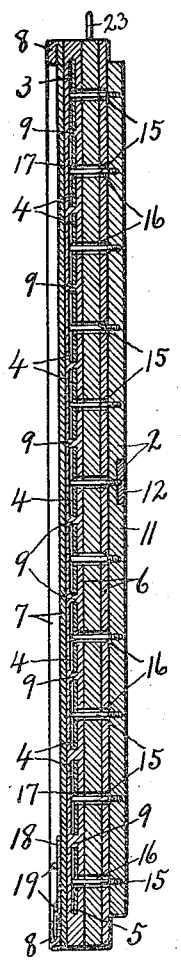
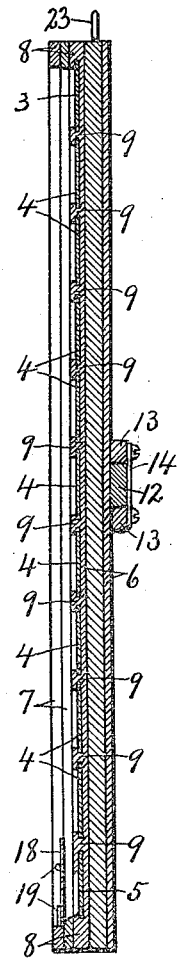
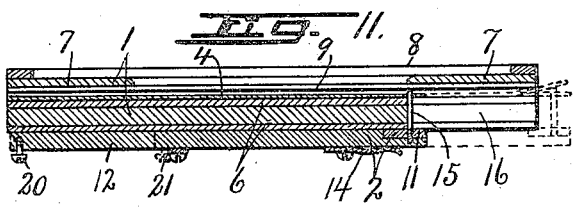
WITNESSES:
INVENTOR
H. D. Rickard
BY Howard P. Denison
ATTORNEY

UNITED STATES PATENT OFFICE.

HORACE D. RICKARD, OF SYRACUSE, NEW YORK.

EDUCATIONAL APPLIANCE.

1,169,510.  Specification of Letters Patent.  Patented Jan. 25, 1916.

Application filed October 8, 1915. Serial No. 54,728.

*To all whom it may concern:*

Be it known that I, HORACE D. RICKARD, a citizen of the United States of America, and resident of Syracuse, in the county of Onondaga, in the State of New York, have invented new and useful Improvements in Educational Appliances, of which the following, taken in connection with the accompanying drawings, is a full, clear, and exact description.

This invention relates to certain improvements in educational appliances adapted to be used in the elementary departments of schools for mental training in problems of addition, which, at present, is regarded by the most advanced educators as being the basis of elementary arithmetic.

The main object is to provide a more convenient, interesting and effective means for impressing upon the mind of the student the results or sums of various combinations of numerical factors so that in after years the student may be better equipped for expeditious and accurate calculation of the elementary problems of arithmetic.

In other words, I have sought to place in the hands of educators a simple and comparatively inexpensive device by which the sums of an almost unlimited number of combinations of numerical factors running into the millions may be firmly impressed upon the mind of the student by reason of the competitive interest aroused in the student by the use of such a device.

Another object is to provide simple means whereby the numerical factors may be changed and interchanged to produce the large variety of different combinations referred to.

Other objects and uses relating to specific parts of the device will be brought out in the following description.

In the drawings—Figure 1 is a front elevation of an educational appliance embodying the features of my invention, the parts being shown in their normal positions and the shutter for the numerical result removed, but indicated by dotted lines. Fig. 2 is an elevation similar to Fig. 1, except that the top plate and extra side plate are interchanged, and the carriage for the columnized number plates is drawn out to the limit of its movement for presenting different numerical factors at the sight opening in the main supporting frame. Figs. 3 and 4 are opposite face views of the top plate shown in Fig. 1 and side plate shown in Fig. 2. Figs. 5 and 6 are opposite face views of the top plate shown in Fig. 2 and side plate shown in Fig. 1. Figs. 7 and 8 are opposite face views of one intermediate plate shown in Figs. 1 and 2. Figs. 9 and 10 are transverse vertical sectional views taken, respectively, on lines 9—9 and —10—10, Fig. 1. Fig. 11 is a transverse horizontal sectional view taken on line 11—11, Fig. 1.

This device comprises a main supporting frame —1—, a sliding frame or carriage —2— mounted upon the main supporting frame, and a plurality of, in this instance eleven, number plates —3—, —4— and —5—, slidable in suitable guides upon the main supporting frame and operatively connected to the carriage —2— to permit them all to be moved back and forth in their respective guides simultaneously.

The main supporting frame is substantially rectangular and comprises a substantially flat back board —6— composed of wood layers secured together face to face to prevent warping and a front board consisting of opposite upright side rails —7— and bottom and top rails —8—, said frame being provided with transverse ribs or parting strips —9—, all of which parts are secured together by suitable fastening means, as nails —10—, the parting strips or ribs —9— being spaced substantially uniform distances apart and in parallelism and their adjacent edges channeled to form lengthwise guides for the number plates —3—, —4— and —5—.

The side rails —7— are spaced a sufficient distance apart in parallelism to disclose a predetermined number of, in this instance six, figures of the several number plates, and each rail is of substantially the same width as half the width of the intervening space or sight opening so as to cover approximately three of the figures at either side of said opening, the bottom and top rails —8— being relatively narrower than the side rails and disposed at right angles thereto, thus forming therewith an intervening rectangular sight opening, exposing to view six figures of each of the number plates.

The sliding carriage —2—, constituting the operating means for the number plates, is slidably mounted on the main supporting frame —1— and comprises an upright bar —11—, extending vertically along and in close proximity to the back of the back board —6— and secured near its center to a cross bar —12—, which is slidably mounted between cleats —13— on the back of the back board —6—, and is held against rearward displacement by a spring plate —14— bearing upon the cross bar —12— with sufficient tension to frictionally hold the carriage against accidental displacement when adjusted to a particular position.

Secured to the upright bar —11— of the carriage is a series of, in this instance eleven, pins —15— which project forwardly therefrom through registering slots —16— in the back board and enter suitable apertures or eyelets —17— in the adjacent end of the number plates —3—, —4— and —5— for the purpose of shifting said number plates across the sight opening in the front of the main supporting frame as the carriage is moved back and forth by hand, the upright bar —11— constituting a handpiece by which the carriage may be easily operated.

The number plates —3—, —4— and —5— are all of substantially the same size and are disposed one above the other in a substantially flat plane in their respective guideways so as to move transversely across the sight opening in the front of the frame, said plates being held in spaced relation by parting strips —9— which are relatively narrow as compared with the width of the number plates so as to leave the figures on said plates exposed to view through said opening.

Each of the intermediate number plates —4— bears upon its obverse face a series of, in this instance nine, different figures corresponding to the nine digits, but promiscuously arranged in equally spaced relation so that a predetermined number of, in this instance six, figures will be plainly visible at a distance through the sight opening in the frame, the arrangement of the digits on each number plate being different from that on the other plates.

Each of the factor plates —4— also bears upon its reverse side a result in distinctive type similar to that appearing on the obverse side of the first-named result plate, and bearing a definite numerical relation to the number on the back or reverse side of said result plate, so that when the positions of the result plate and any one of the factor plates are interchanged and reversed, the result plate becomes a factor plate and the factor plate becomes a result plate, the exposed number on the latter plate being the sum of the numbers of the factor plates under the altered arrangement of factors. For example, if the result plate —5—, shown in Fig. 1, bears upon its reverse face any other number, as for example the nine digits arranged in different order from those on the other factor plates —4— and is interchanged with any one of said other plates, it is evident that the sum of the altered arrangement will be different and such sum will have to be computed and is printed on the back of the interchanged factor plate which then becomes the result plate, showing the result of the new combination;—that is if the exposed numbers on the reverse side of the result plate should be 631279 and this plate should be interchanged with the factor plate bearing the exposed number 948756, then the new result or sum as it would appear on the lower plate after the change is made would be 471243 with a 5 above the first 4, as shown in Fig. 8.

Inasmuch as the purpose of the entire device is to drill the mind of the student in speedily and accurately adding greater or less numbers or different combinations of figures, it is desirable to obscure the sum on the result plate until the sums are obtained mentally or by writing them down on a separate sheet and then comparing those results obtained with the key as indicated on the result plate, and for this purpose I have provided a shutter —18— of sufficient size to cover the number on the result plate, said shutter being loosely held in place on the frame by retaining pins —19—, thus permitting the shutter to be removed or replaced at will by the operator.

When the carriage is in its normal position, the three figures on the left-hand end of each of the factor plates —4— and result plate are concealed from view by the superposed rail —7— of the frame, but by shifting the carriage to the right, these previously concealed figures may be brought into registration with the sight opening one or more at a time, during which operation a corresponding number of the right-hand figures will be drawn under and concealed by the right-hand rail —7—, said carriage being movable from its normal position a distance corresponding to the three figure spaces and is limited in its outward movement by coöperative stops —20— and —21—, while the inward movement is limited by the engagement of the pins —15— with the inner ends of the slots —16—.

It is, of course, obvious that if the entire series of number plates are shifted from their normal position one or more figure spaces, the result would be inaccurate, and in order to compensate for this inaccuracy, a different number must be substituted for one of the factor numbers which, when added to the other numbers will produce a sum indicated on the shifted result plate, and for convenience of description the top plate —3— may be regarded as a "compensating plate" and differs from the remaining factor plates in that it does not have a result on its reverse side, but in place thereof is provided with what may be termed a "compensating number" which provides for the normal position of the carriage and a shift of one figure space from normal position. For example, the number appearing on the "compensating plate", when the carriage is in its normal position, is 784641, and if the carriage is shifted one figure space to the right this card must be removed and reversed to present a number in the sight opening as 378469, which will produce the sum appearing on the result plate when the carriage is so shifted, it being understood that the number on the reverse side of the plate is shifted one figure space to the left so that its units figure will appear in the same vertical column as the right-hand column of figures under the altered arrangement. Now, if it is desired to obtain the sum of one or more additional combinations of numbers, it is necessary to introduce an extra "compensating plate" as —3'— which is normally hung upon a pin or peg —22— on the frame at one side of the sight opening ready for use so that if the carriage is withdrawn two figure spaces, the "compensating plate" —3— will be withdrawn and the extra plate —3'— substituted therefor, bearing, in this instance, the numeral 937852 exposed through the sight opening in order that the sum appearing on the result plate may be accurate.

The object of this promiscuous arrangement of the figures is to avoid as far as possible repetition of combinations of figures in the several columns which are to be added, it being understood that when the number plates are assembled upon the carriage, the units figures of the several plates will be in the same vertical column, the tens in the next column to the left, the hundreds in the next column and so on to the last left-hand column.

The lower number plate —5— which may be termed the result or sum plate bears figures representing the sum of the numbers on the other plates, alined with their respective columns, and inasmuch as the sum will involve the use of, at least, one extra figure at the left, such extra figure is placed upon the sum plate directly over the extreme left-hand figure which appears in the sight opening, or above the sixth figure at the left of the units figure, under which conditions the lower partition —9— is made somewhat wider vertically than the superposed partitions and is provided with a recess —9'— registering with the extra left-hand figure to render such extra figure visible with the remaining figures of the sum. This numerical result is distinguished by color or other characteristic different from that of the numbers on the factor plates, said result plate being interchangeable with any one of the factor plates, but bears upon its reverse side a series of, in this instance nine, figures or digits similar to those appearing on the obverse sides of the several factor plates —4—, except in different arrangement. Again, if it is desired to add another new combination of numbers, the carriage is shifted another figure space, whereupon the "compensating card" —3'— is removed and reversed to disclose a number as 493789, which, when added to the other numbers appearing in the sight opening, will give the sum appearing on the result plate.

It is now evident that in making the several shifts for producing different combinations of numbers to be added, it is only necessary to change the "compensating plate" for each shift, the other plates remaining in the same position on the carriage, and although I have shown each of the factor plates —4— as provided with a series of, in this instance nine, figures corresponding to the nine digits arranged in different order, as the most convenient means of disciplining the mind in adding a large number of different combinations of figures, it is apparent that the number of figures in the several plates, as well as the number of factor plates, may be varied without departing from the spirit of my invention.

The frame —1— is provided at the top with suitable eyelets —23— by which it may be suspended from nails or other suitable supports on a wall.

The front ends of the pins —15— terminate in approximately the plane of movement of the number plates which are attached thereto so that when the carriage is withdrawn a sufficient distance to bring the outer ends of the plates beyond the corresponding edge of the adjacent side rail —7—, they may be sprung forwardly out of interlocking engagement with their respective pins and, therefore, detached and withdrawn as may be desired for interchanging them one with the other, it being understood that the plates are sufficiently resilient or flexible for such yielding movement, and at the same time automatically reëngage the ends of the pins under their own elasticity when their eyelets are registered therewith, thereby assuring the proper adjustment of all of the plates as the carriage is moved in either direction.

What I claim is:

1. In an educational device of the character described, a frame having a sight opening, a plurality of factor plates slidably mounted in the frame, one above the other across the opening and bearing numerical factors exposed through said opening and columnized for adding, and means for simultaneously shifting said plates to conceal portions of their factors behind a portion of the frame and to expose other portions of the factors of different values through the sight opening.

2. In an educational device of the character described, a frame having a sight opening, a plurality of factor plates mounted in the frame one above the other across the opening and bearing numerical factors exposed through said opening and columnized for adding, a result plate underlying the factor plates and bearing the sum of those factors, means for shifting all of the plates simultaneously to bring the units figures of each plate behind a portion of the frame to cut off such figures from view and produce numerical factors of different values, one of said factor plates being reversible and bearing upon its reverse side a numerical factor which, when added to the remaining factors, will produce the sum indicated by the exposed portion on the result plate.

3. In an educational device of the character described, the combination of a frame having a sight opening, a carriage slidable on the frame, separate factor plates arranged in sequence one above the other and provided with numerical factors columnized for adding and exposed through said opening, a result plate underlying the factor plates and bearing the numerical sum of the factors, all of said plates being attached to the carriage to move therewith.

4. In an educational device of the character described, the combination of a frame having a sight opening and guide-ways one above the other, a series of factor plates slidable in said guide-ways and bearing different numerical factors exposed through said opening and columnized for adding, a result plate slidable in the lowermost guide-way and bearing the numerical sum of the factors, and a shutter movable to and from a position across said numerical sum.

5. In an educational device of the character described, the combination of a frame having a sight opening and guide-ways one above the other, a series of factor plates slidable in said guide-ways and bearing different numerical factors exposed through said opening and columnized for adding, a result plate slidable in the lowermost guide-way and bearing the numerical sum of the factors, a shutter movable to and from a position across said numerical sum, and means for shifting all of the plates simultaneously in their respective guide-ways to change the numerical value of the factors appearing through the opening, one of the factor plates being reversible in its guide and bearing upon its reverse side a number, which, when added to the remaining numerical factors, will produce the numerical sum appearing on the result plate through the sight opening.

6. In an educational device of the character described, the combination of a frame having upright side rails in spaced relation forming a sight opening, a plurality of factor plates slidably mounted on the frame one above the other at the back of the side rails and across said opening and provided with numerical factors columnized for adding, a result plate slidably mounted in the frame below the factor plates and at the back of the side rails, means for shifting all of said plates in their respective slides to obscure the units figures of said plates behind one of the rails, thereby exposing numbers of different values through the sight opening, one of the factor plates being reversible and bearing upon its reverse side a number which, when added to the remaining factors, will produce the sum indicated on the result plate through said opening.

7. In an educational device of the character described, the combination of a frame having a sight opening, a series of number plates of substantially the same size removably mounted in the frame one above the other, said plates being reversible and interchangeable, the lowermost plate being the result plate and bearing upon its obverse face the sum of the numbers on the obverse face of the superposed factor plates and having upon its reverse side a number adapted to be presented to the sight opening in place of one of the factors of the factor plates when the result plate is interchanged therewith, said factor plate bearing upon its reverse side a number which will be the sum of the rearranged factors when said factor plate and result plate are interchanged.

In witness whereof I have hereunto set my hand this 24th day of September, 1915.

HORACE D. RICKARD

Witnesses:
H. E. CHASE,
ALICE M. CANNON.